April 17, 1934.　　　F. PIZZINI ET AL　　　1,955,342
MACHINE FOR MAKING FOOD PRODUCTS
Filed June 22, 1933　　2 Sheets-Sheet 1
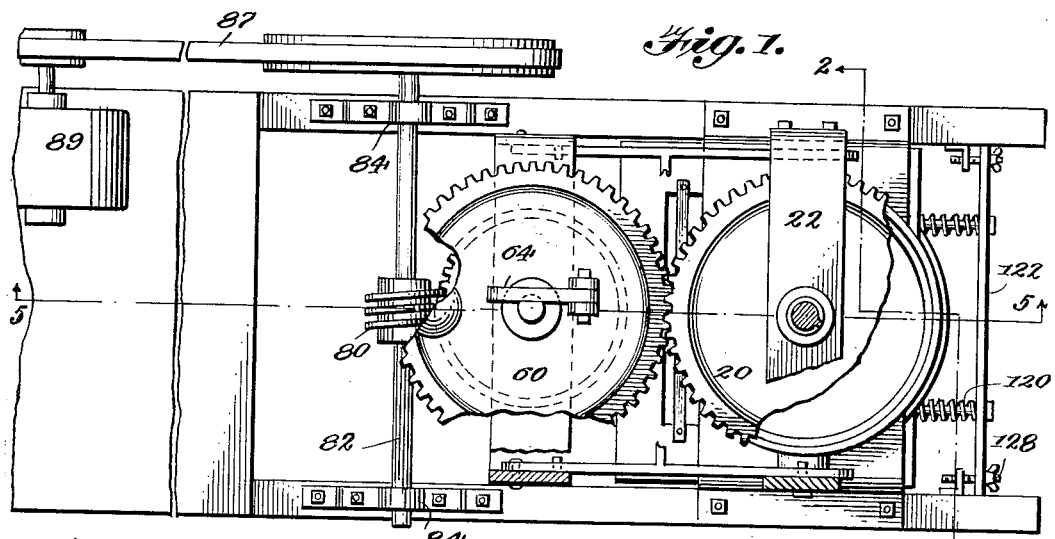
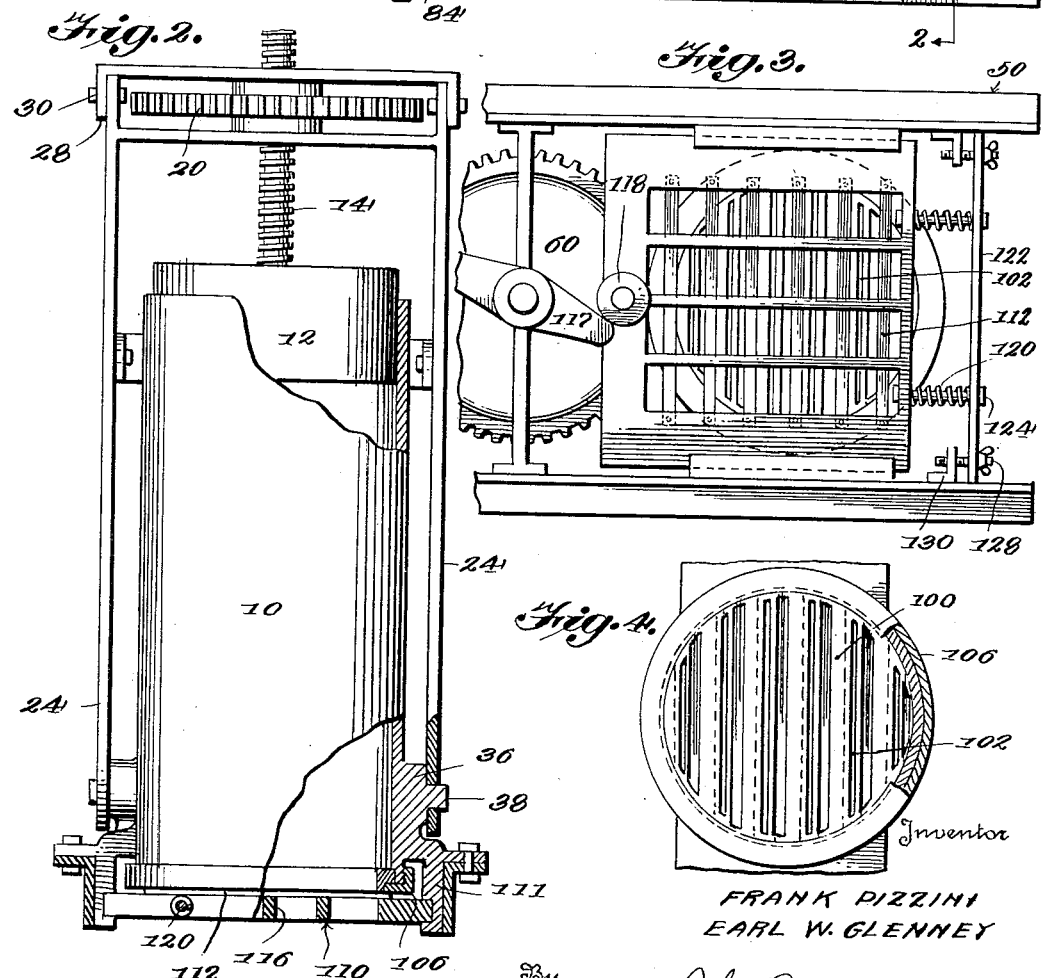
Inventor
FRANK PIZZINI
EARL W. GLENNEY
By
Attorney April 17, 1934.　　　F. PIZZINI ET AL　　　1,955,342
MACHINE FOR MAKING FOOD PRODUCTS
Filed June 22, 1933　　2 Sheets-Sheet 2
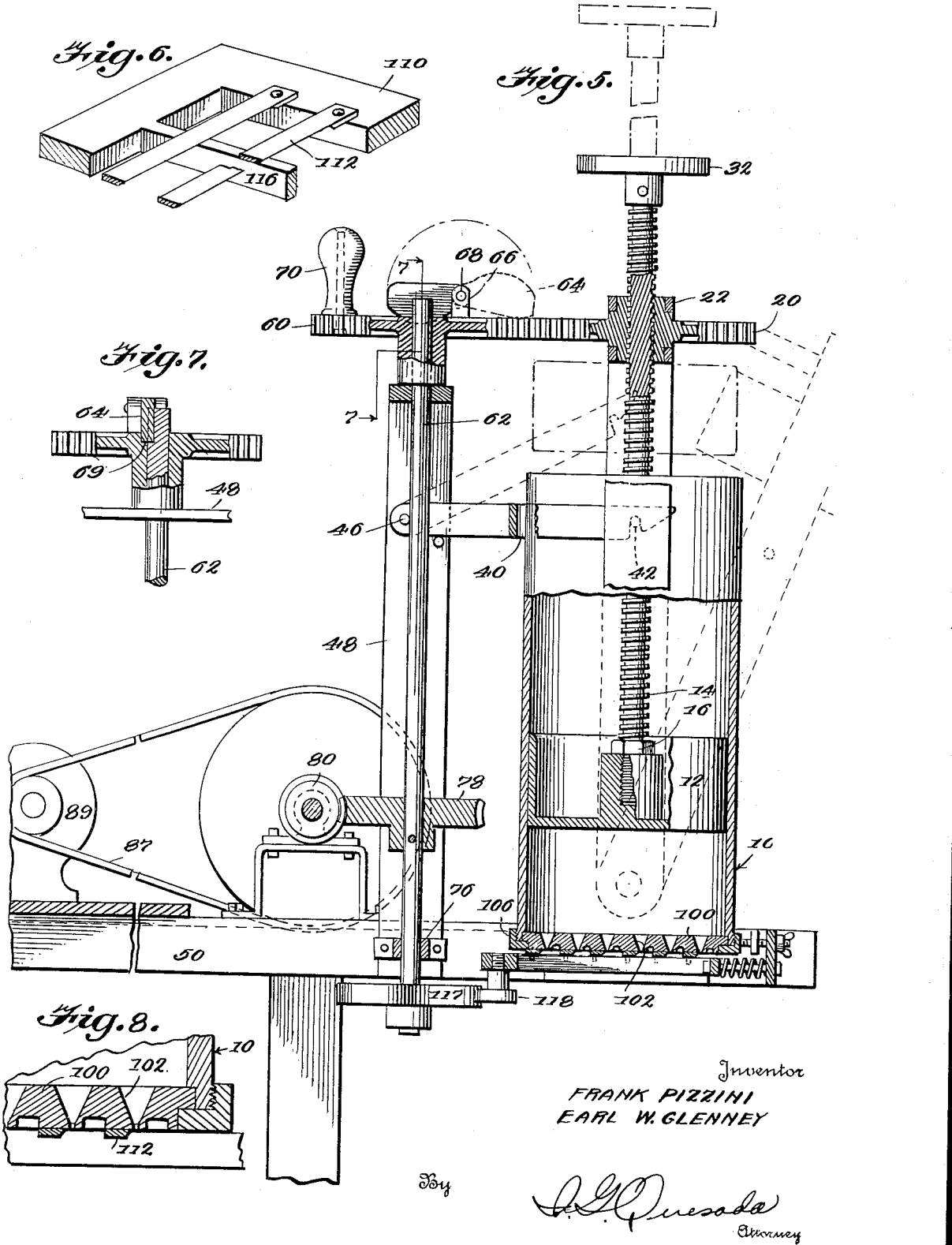
Inventor
FRANK PIZZINI
EARL W. GLENNEY
By
Attorney Patented Apr. 17, 1934

1,955,342

UNITED STATES PATENT OFFICE 1,955,342

MACHINE FOR MAKING FOOD PRODUCTS

Frank Pizzini and Earl W. Glenney, San Antonio, Tex.

Application June 22, 1933, Serial No. 677,116

4 Claims. (Cl. 107—14)

This invention relates to an apparatus for the preparation of wafer-like edibles from a batter of corn or the like of an appropriate consistency.

More particularly, the invention forming the subject of this application has reference to an apparatus by which a batter of corn or the like of proper consistency may be divided into wafer-like portions to be cooked in a vat and subsequently packed in lunch paper, cellophane bags or the like for distribution in trade.

One of the principal features of the invention will be found to reside in the particular means by which the batter when placed under pressure is divided into wafer-like portions through the actuation of a novel cutting mechanism and means for actuating the cutting mechanism will also be found to constitute another feature of the invention.

A further object is to provide simple means by which the pressure elements for the batter may be retracted from the batter receiving cylinder and swung to an out of the way position either for the purpose of refilling the cylinder or for cleaning or repairing various parts of the apparatus.

Another attribute of the invention resides in the particular means by which the follower or pressure medium for the batter may be disconnected from the power elements of the apparatus and withdrawn from the cylinder through the manual operation of one of the motion transmitting gears embodied in the invention.

Another object is to provide an apparatus of the character specified which is of highly simplified construction, sanitary and durable in use, and in addition there is to be considered the fact that the operation of the invention is fascinating to watch so that such operation may attract passers-by and result in the sale of the products of the apparatus.

Other objects and advantages will be apparent during the course of the following description.

In the accompanying drawings, forming a part of this application and in which like numerals are employed to designate like parts throughout the same, Figure 1 is a fragmentary plan view of the apparatus, Figure 2 is a vertical sectional view taken on line 2—2 of Figure 1, Figure 3 is a fragmentary bottom plan view of the machine, Figure 4 is a fragmentary plan view of a cylinder embodied in the invention, Figure 5 is a vertical sectional view taken on line 5—5 of Figure 1, Figure 6 is a fragmentary perspective of a cutter embodied in the invention, Figure 7 is a vertical detail sectional view taken on line 7—7 of Figure 5, Figure 8 is a detail sectional view illustrating a cut off mechanism for the batter.

In the drawings, wherein for the purpose of illustration is shown a preferred embodiment of the invention, the numeral 10 designates a container preferably in the form of a cylinder open at the outer end thereof for the reception of a batter of a suitable consistency.

It is believed to be clear, especially from an inspection of Figure 5, that after an appropriate quantity of batter has been placed in the cylinder 10, a follower 12 conforming in cross sectional area and dimension to the interior of the container 10 is introduced into such container. The follower 12 is found to have associated therewith, a feed screw 14 secured to the hub of the follower through the medium of a lock nut 16 or other suitable fastening device.

The frictional contact between the follower 12 and the side walls of the surrounding container and the pressure relation between the bottom of the follower and the barrel has been found to be sufficient to hold the screw 14 against turning but, of course, if desired additional means such as a key and slot connection may be provided to hold the follower 12 and the associated feed screw against turning.

As further shown in Figure 5, the feed wheel or gear 20 has the hub thereof threaded on the feed screw 16 and is provided at the upper and lower portions thereof with axial bosses mounted in bearings or openings in the upper and lower bight portions 22 of a U-shaped yoke 24.

By reference to Figure 2 it will be seen that the upper bight portion or connecting portion 22 of the yoke 24 is secured to the sides of the yoke through the medium of depending ears 28 and fastening devices 30 of any suitable character. Thus, when it is desired to dismantle the yoke and associated parts it is a simple matter to remove the upper connecting member 22, allowing the gear 20 to be detached. The upper portion of the screw 14 is provided with a suitable hand wheel 32 by which the screw may be advanced or retracted and of course, this hand wheel is held in place by a key or hinge connection such as is found to be expedient.

In Figure 2 it is illustrated that the lower portion of the cylinder 10 is provided with oppositely located bosses 36, having radial trunnions 38 to which the lower portions of the sides of the U-shaped yoke 24 are pivotally connected. The pivotal mounting of the U-shaped yoke 24 allows the yoke and the feed screw carried thereby to be swung from the upright position as shown in full lines in Figure 5, to the dotted line position shown in the same figure with the result that the follower 12 may be swung to an out of the way position when it is desired to furnish a supply of batter to the cylinder 10. In this connection it is observed that when the cylinder is to be furnished with a supply of batter the follower 10 is retracted to a point above the cylinder, after which the yoke 24 and the parts carried thereby may be swung to the out of the way position suggested in dotted lines in Figure 5, to open the cylinder for the reception of the batter.

However, during the actual operation of the machine in the production of wafer-like chips, the yoke 24 and associated parts are held in the full line position shown in Figure 5, by horizontally disposed arms 40, the forward portions of which are formed with notches engaging pins 42 carried by the sides of the yoke 24. The arms 40 are in turn horizontally pivoted as indicated at 46 to a second yoke or support 48. As shown in Figure 5, the yoke 48 is substantially of U-shaped formation and is rigidly mounted upon the main frame 50 of the machine.

With further reference to Figure 5 it will be seen that the feed wheel or gear 20 is adapted for mesh with a driving gear 60 and that such driving gear 60 is formed with a hub receiving a vertically disposed drive shaft 62. A driving connection between the vertically disposed shaft 62 and the associated spur gear 60 is through the intervention of a horizontally pivoted key 64. The key 64 is horizontally pivoted to the gear 60 through the employement of upstanding apertured ears 66 and a pivot element 68 and the lower edge portion of the pivoted key 64 is formed with a lobe or rounded depending portion extended into a notch 69 in the upper portion of the gear 60 and flatly engaging a flat in one side of the extended upper portion of the shaft 62 with the result that a detachable driving connection is established between the members 60 and 62. More specifically, the shaft 62 is extended to a point above the drive gear 60 and has one side thereof cut away to form a flat engaged by one side of the pivoted key 64. In addition, the lower end of the cut-away portion in the upper end of the shaft 62 forms a shoulder, which as shown in Figure 7, is flush with the bottom of the notch 69 so as to form in effect, a socket for the reception of the pivoted key 64.

The gear 60 has the hub thereof rotatably mounted upon the bight portion of the U-shaped yoke 48 and during normal operation of the apparatus in the production of wafer-like chips the pivoted key 64 occupies the full line position shown in Figure 5. However, when it is desired to retract the follower 12 the key 54 is swung back to the dotted line position shown in Figure 5 disconnecting the gear 60 from the drive shaft 62 whereupon the operator has only to engage the handle 70 carried by the gear 60 and turn the gear 60 in a direction to bring about the retraction of the follower 12, all of which is clear from an inspection of the drawings.

The vertically disposed drive shaft has the lower portion thereof extended through a bearing 76 carried by the frame 50. At a point above the bearing 76 the drive shaft 62 carries a worm wheel 78 in constant mesh with a worm 80 mounted on a transversely extending shaft 82.

Referring now to Figure 1, it will be seen that the transversely extending shaft 82 is mounted in bearings 84 carried by the frame and is provided with a band wheel or pulley 86 about which an endless belt or other driving means 87 extends. An electric or other motor 89 is shown to have connection with the belt and provides a driving force or power for the apparatus.

From the foregoing it is believed to be clear that the cylinder is furnished with a supply of batter of an appropriate consistency and is placed under pressure by the follower 12 and associated parts and that when it is desired to replenish the supply of batter it is a simple matter to retract the follower or swing the same to the out of the way position shown in dotted lines in Figure 5, exposing the upper end of the cylinder for the reception of the batter.

Referring now to the means by which the batter is divided into a plurality of wafer-like chips, attention is invited to Figure 5 in which it is shown that the lower end of the cylinder 10 is in the form of a grill work or grating 100 having a plurality of parallel incisions 102 V-shaped in cross section and diminishing in cross sectional area toward the lower ends thereof defining rather narrow outlet slots for the discharge of the batter under pressure. An annulus 106 is threaded onto the lower portion of the cylinder 10 and is provided with an inwardly directed flange underlying the peripheral portion of the grating 100 and providing a means by which the same is held securely in place.

As the batter is directed through the incision or outlets 102 the same is subjected to the operation of a horizontally movable cutter embodying a rectangular frame 110 and having a plurality of spaced parallel cutting elements or knives 112. It is shown in Figure 6 that the cutting elements 112 are braced at the under sides thereof by a plurality of spaced parallel connecting elements 116 extending at right angles to the knives 112. In addition to forming bracing elements, the members 116 provide a means for further dividing the batter into small chips in preparation for a cooking process.

By reference to Figure 2 it will be seen that the cutter 110 is supported for horizontal sliding movement by oppositely located guides 111 depending from opposite sides of the cylinder 10 and having the inner sides thereof formed with grooves slidably receiving the edge portions of the cutter.

Referring now to Figures 3 and 5 it will be seen that the cutter 110 is intermittently actuated through the operation of a cam 117 having oppositely directed lobes adapted for alternate engagement with a depending roller 118 carried by the under side of the frame of the cutter 110. The alternate engagement of the lobes of the cam 117 will bring about the longitudinal movement of the cutter 110 against the tension of a suitable number of expansion springs 120. The expansion springs are shown to be confined between what might be said to be the forward end of the cutter 110 and a transversely extending abutment member 122, and such springs are mounted upon stems 124.

By reference to Figure 3 it will be seen that the transversely extending abutment member 122 is mounted upon bolts 128 which are, in turn, threaded through brackets or ears 130 and such bolts are provided with thumb nuts providing a means by which the abutment member 122 may be adjusted so that in turn, the tension of the associated springs may be adjusted.

Thus, the knife or cutter 110 is intermittently moved in one direction by the cam 117 and is returned through the operation of the springs associated with the knives. This operation is, of course, intermittent and brings about the division of the batter into wafers of a size suitable for the trade. It is clearly shown in Figure 5, that the cam 117 is keyed or otherwise secured to the lower portion of the drive shaft 62.

In the use of the machine, the follower 12 is first retracted to the dotted line position shown in Figure 5 allowing an appropriate quantity of batter to be introduced into the cylinder 10 and following this, the member 12 is introduced into the container and the operation of the motor will bring about the turning of the shaft 62 and the gears 20 and 60 with the result that the follower will be advanced at a predetermined rate to place the batter under pressure.

Simultaneously with the advancement of the follower 12, the cutter 110 is reciprocated at predetermined intervals to bring about the cutting off of such portions of the batter as have been discharged from the lower end of the cylinder 10 in sheet-like form.

As shown in Figure 8, the parallel bars of the grating 100 are longitudinally grooved between the sides thereof. It has been found that this allows the batter cuttings to drop off immediately after they have been cut off by the knife 112. Without the longitudinal grooves in the lower side of the grating bars there is a tendency for the batter chips to accumulate or become suspended from the grating.

The wafer-like bodies thus formed as a result of the operation of the knife are dropped into a vat located below the cylinder or are conducted to another point of preparation.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention what is claimed is:

1. An apparatus of the character specified, a cylinder having an outlet, a follower in the cylinder and having a feed screw, a gear wheel mounted on the feed screw, a yoke of U-shaped formation having sides horizontally pivoted to the cylinder and having a bight portion engaging opposite ends of said gear wheel, means engaging the sides of said yoke to detachably hold the yoke and the feed screw and the follower in an upright position and being releasable so as to allow these parts to be swung to an out-of-the-way position, a second gear engaged with the first named gear, a drive shaft extending through the second named gear, a second yoke supporting the second named gear, and a source of power connected to said drive shaft.

2. An apparatus of the character specified, a cylinder having an outlet, a follower in the cylinder and having a feed screw, a gear wheel mounted on the feed screw, a yoke of U-shaped formation having sides horizontally pivoted to the cylinder and having a bight portion engaging opposite ends of said gear wheel, means engaging the sides of said yoke to detachably hold the yoke and the feed screw and the follower in an upright position and being releasable so as to allow these parts to be swung to an out of the way position, a second gear engaged with the first named gear, a drive shaft extending through the second named gear, a second yoke supporting the second named gear, a source of power connected to said drive, a knife at the outlet of said cylinder and being provided with a depending roller, and a cam carried by said drive shaft and intermittently engaging said roller.

3. In a structure of the character specified, a cylinder having an outlet, a cutter below said outlet and embodying a rectangular frame having a plurality of spaced parallel cutting elements, means to move the cutter in one direction, a plurality of expansion springs to move the cutter in the other direction and engaging one end of said frame, stems carried by said frame and extending through said springs, an abutment strip having openings receiving said stems and engaging said springs, and adjustable supports engaging said abutment strip at the ends thereof.

4. In a structure of the character specified, a shaft having one side thereof provided with a shoulder and a flat immediately beyond said shoulder, a gear on said shaft and having a notch in opposed relation to said flat and having a bottom wall flush with said shoulder, and a key horizontally pivoted to said gear and having a lobe to extend into said notch and engage the shoulder of said shaft.

FRANK PIZZINI.
EARL W. GLENNEY.